(12) United States Patent
Hirose et al.

(10) Patent No.: US 8,773,116 B2
(45) Date of Patent: Jul. 8, 2014

(54) ROTATION ANGLE DETECTING DEVICE

(75) Inventors: Shinji Hirose, Gifu (JP); Kouji Oike, Kyoto (JP); Kiyotaka Sasanouchi, Osaka (JP)

(73) Assignee: Panasonic Corporation, Osaka (JP)

( * ) Notice: Subject to any disclaimer, the term of this patent is extended or adjusted under 35 U.S.C. 154(b) by 286 days.

(21) Appl. No.: 13/220,818

(22) Filed: Aug. 30, 2011

(65) Prior Publication Data

US 2012/0056617 A1    Mar. 8, 2012

(30) Foreign Application Priority Data

Sep. 3, 2010  (JP) .................. 2010-197296
Nov. 4, 2010  (JP) .................. 2010-247068
Nov. 10, 2010 (JP) .................. 2010-251469

(51) Int. Cl.
*G01B 7/30*    (2006.01)

(52) U.S. Cl.
USPC .................. 324/207.25; 324/207.2

(58) Field of Classification Search
USPC .................. 324/167, 207.11–207.26
See application file for complete search history.

(56) References Cited

U.S. PATENT DOCUMENTS

| | | | | |
|---|---|---|---|---|
| 6,172,498 | B1 * | 1/2001 | Schmidt et al. | 324/207.12 |
| 6,553,289 | B2 * | 4/2003 | Maki et al. | 701/29.1 |
| 6,560,553 | B1 * | 5/2003 | Hirobe et al. | 702/94 |
| 2001/0009366 | A1 * | 7/2001 | Kono et al. | 324/207.2 |
| 2004/0145364 | A1 * | 7/2004 | Onishi et al. | 324/207.2 |
| 2007/0108967 | A1 * | 5/2007 | Okuya et al. | 324/207.2 |
| 2007/0205762 | A1 * | 9/2007 | Nakata et al. | 324/207.25 |
| 2009/0066325 | A1 * | 3/2009 | Koma et al. | 324/207.25 |
| 2009/0179634 | A1 * | 7/2009 | Nakazato et al. | 324/207.25 |

FOREIGN PATENT DOCUMENTS

JP    2001-317909    11/2001

* cited by examiner

*Primary Examiner* — Arleen M Vazquez
*Assistant Examiner* — Brent J Andrews
(74) *Attorney, Agent, or Firm* — Panasonic Patent Center

(57) ABSTRACT

A rotation angle detecting device includes a rotating body rotating according to rotation of a vehicle pedal; a magnet attached to the rotating body; a magnetism detection element disposed facing the magnet at a predetermined interval from the magnet; and a first control circuit connected to the magnetism detection element. The center of the magnet is placed at the rotation center of the rotating body. The magnetism detection element detects magnetism of the magnet to output a detection signal. The first control circuit outputs an angle signal corresponding to a rotation angle of the rotating body according to the detection signal, and outputs a switching signal according to the rotation angle of the rotating body. The rotation angle detecting device reliably detects a rotation angle and turns a stop lamp on and off for example with a simple structure.

4 Claims, 22 Drawing Sheets

ROTATION ANGLE DETECTING DEVICE

TECHNICAL FIELD

The technical field relates to a rotation angle detecting device mainly used for detecting a rotation angle of an automobile pedal.

BACKGROUND ART

In recent years, with automobiles achieving higher functionality, devices have been increasing that detect a step-on amount or rotation angle of, for example, a brake pedal using various types of rotation angle detecting devices and switches to perform various types of control on a vehicle.

FIG. 20 is a perspective view of conventional rotation angle detecting device 5.

Rotation angle detecting device 5 includes case 1 and rotating body 2.

Case 1, substantially box-shaped made of an insulating resin, contains rotating body 2 rotatably. One end of rotating body 2 is provided thereon with lever 2A projecting outward from the side opening of case 1.

The inner wall of case 1 and rotating body 2 have a coiled spring attached therebetween in a slightly deformed state. The spring presses rotating body 2 to a predetermined angle to retain lever 2A in place.

Rotating body 2 has a magnet attached thereto, and a magnetism detection element (e.g. a Hall effect sensor) is disposed facing the magnet with a predetermined clearance from the magnet.

FIG. 21 is a perspective view of conventional push switch 10.

Push switch 10 includes case 6 and actuator 7.

Case 6, substantially box-shaped made of an insulating resin contains actuator 7 movably up and down, and operation shaft 7A on the top end of actuator 7 projects upward from the top surface of case 6.

The inner bottom surface of case 6 and the bottom end of actuator 7 have a coiled spring attached therebetween in a slightly deformed state. The spring presses actuator 7 upward.

A fixed contact implanted in case 6 faces a movable contact made of a conductive metal, attached to actuator 7 in case 6. The movable contact and the fixed contact form a switch contact.

As shown in FIG. 22, rotation angle detecting device 5 is attached to arm 31A near the rotation shaft of automobile brake pedal 31. The magnetism detection element of rotation angle detecting device 5 is connected to, for example, an electronic circuit on the vehicle with lead wires and connectors.

Push switch 10 is attached in front of brake pedal 31 with operation shaft 7A pressed by arm 31A. The switch contact of push switch 10 is connected to a stop lamp and such as an electronic circuit on the vehicle with lead wires and connectors.

In a state where brake pedal 31 is not being depressed and brake pedal 31 is being supported frontward by push rod 33 projecting from the inside of cylinder body 32, actuator 7 of push switch 10 is pressed with the spring being deformed, which causes the movable contact to be separated from the fixed contact, resulting in the switch contact being electrically disconnected. Consequently the stop lamp is off.

When brake pedal 31 is depressed, arm 31A rotates to be separated from the front end of operation shaft 7A of push switch 10, thereby removing the pressing force. Consequently, the elastic return force of the spring causes actuator 7 to move to its original position. The movable contact contacts the fixed contact to make the switch contact in an electrically connected state, thereby lighting the stop lamp.

Rotation of brake pedal 31 causes lever 2A of rotation angle detecting device 5 to swing and rotating body 2 rotates with the spring being deformed, and thus the magnet attached to rotating body 2 rotates as well, which changes the direction of a magnetic field flowing from the magnet to the magnetism detection element opposite to the magnet.

The magnetism detection element detects strength and weakness of magnetism produced by the change of the direction of the magnetic field. According to an angle signal output from the magnetism detection element, the electronic circuit on the vehicle calculates a rotation angle of rotating body 2, namely a step-on amount of brake pedal 31, for various types of control on the vehicle according to the step-on amount.

To sum up, applying brake pedal 31 causes actuator 7 of push switch 10 to move up and down, thereby electrically contacting and breaking the switch contact. This operation turns the stop lamp on and off and rotates rotating body 2 and the magnet of rotation angle detecting device 5. Then, the electronic circuit detects a rotation angle of rotating body 2, namely a step-on amount of brake pedal 31, based upon a change of magnetism detected by the magnetism detection element, for performing various types of control on the vehicle.

A rotation angle detecting device similar to conventional rotation angle detecting device 5 is disclosed in US Patent Application No. 2001/0009366A1.

SUMMARY

A rotation angle detecting device includes a rotating body rotating according to rotation of a pedal of a vehicle; a magnet attached to the rotating body; a magnetism detection element disposed facing the magnet with a predetermined clearance from the magnet; and a first control circuit connected to the magnetism detection element. The center of the magnet is placed at the rotation center of the rotating body. The magnetism detection element detects magnetism of the magnet to output a detection signal. The first control circuit outputs an angle signal corresponding to a rotation angle of the rotating body according to the detection signal and outputs a switching signal according to the rotation angle of the rotating body.

This rotation angle detecting device reliably detects a rotation angle and performs operation such as turning a stop lamp on and off with a simple structure.

DETAILED DESCRIPTION OF PREFERRED EMBODIMENTS

Figure 1:
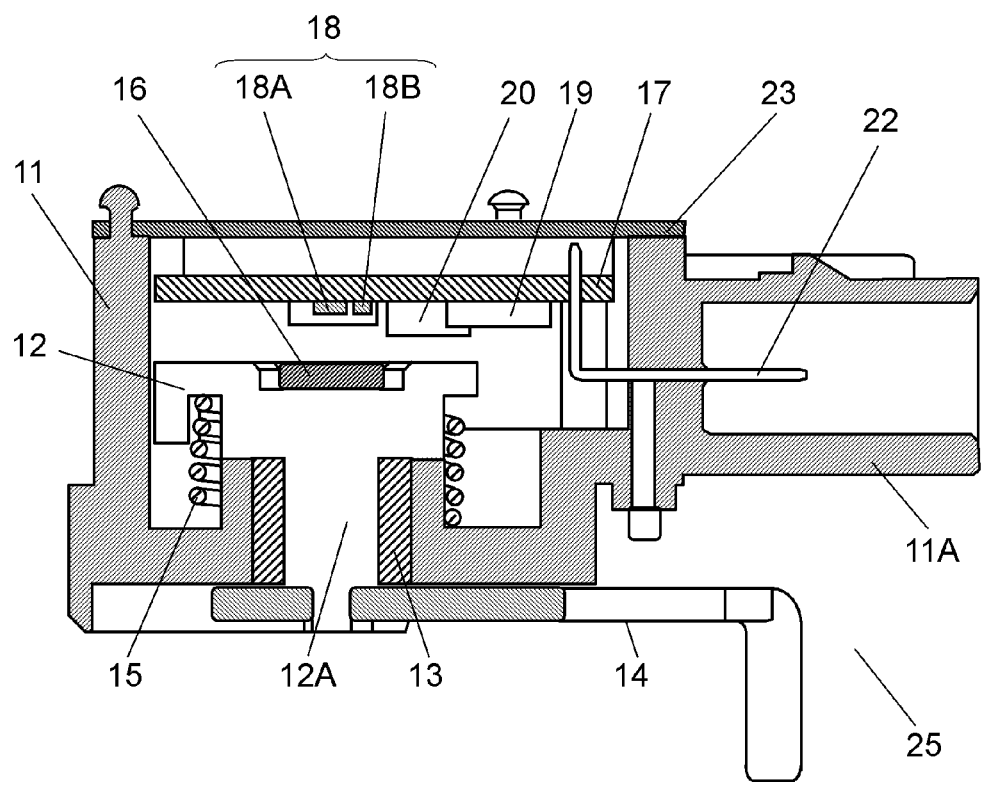
FIG. 1 is a sectional view of a rotation angle detecting device according to an embodiment.
Figure 2:
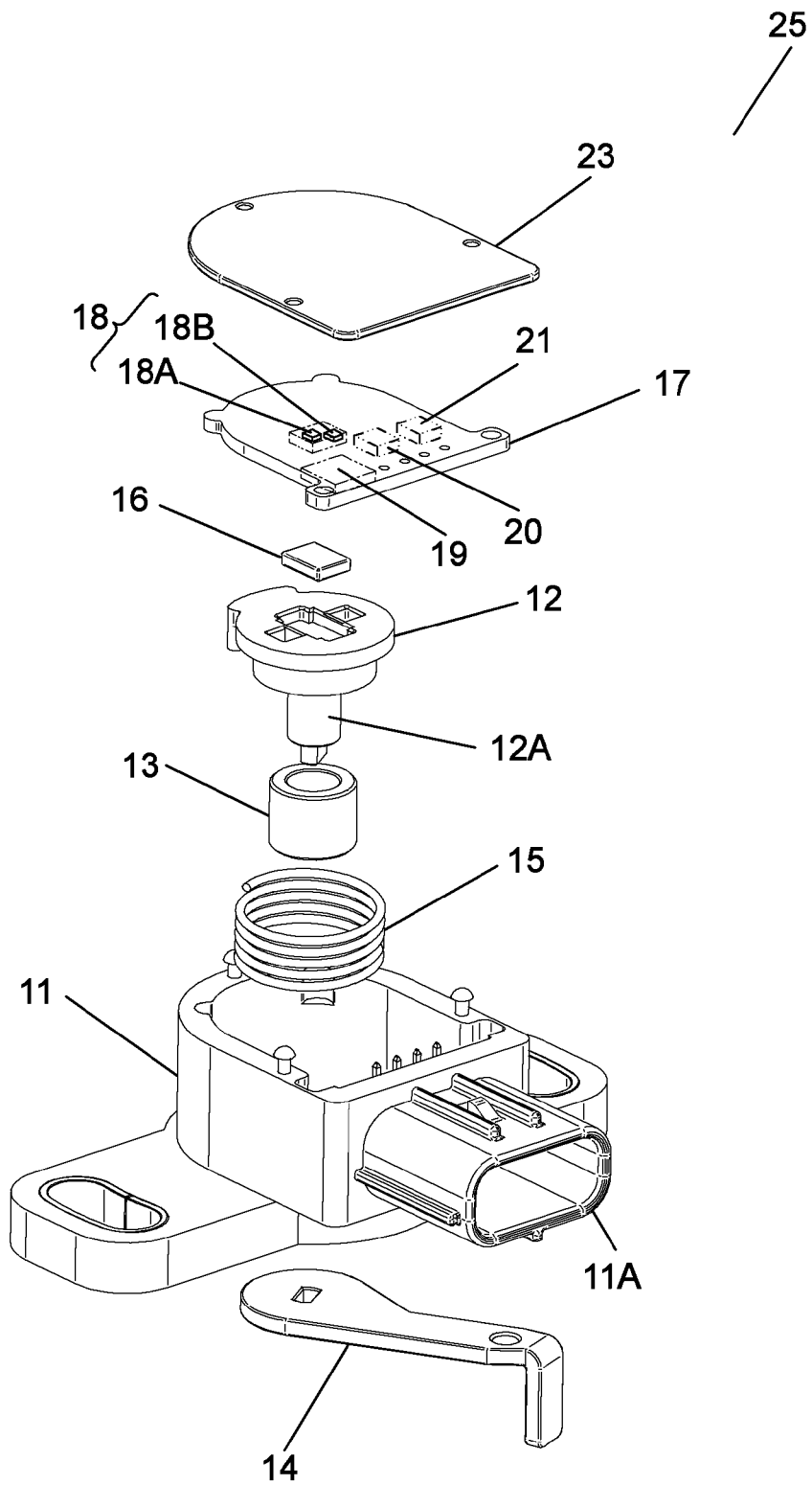
FIG. 2 is an exploded perspective view of the rotation angle detecting device.

FIG. 1 is a sectional view of rotation angle detecting device 25 according to an embodiment. FIG. 2 is an exploded perspective view of the same.

Rotation angle detecting device 25 includes case 11, rotating body 12, spacer 13, lever 14, spring 15, magnet 16, wiring substrate 17, angle sensor 18, first control circuit 19, switching circuit 20, protection circuit 21, terminal 22, and cover 23.

Case 11 is open-topped, substantially box-shaped, made of an insulating resin such as polybutylene terephthalate.

Rotating body 12 is substantially column-shaped, made of an insulating resin as well.

Spacer 13 is substantially cylinder-shaped, made of metal, containing oil inside.

Rotation shaft 12A projecting at the bottom surface of rotating body 12 is inserted into the inner bottom surface of case 11 through spacer 13, and rotating body 12 is contained in case 11 rotatably.

Lever 14 is made of metal such as a steel plate. One end of lever 14 is fastened to the bottom end of rotation shaft 12A projecting from the bottom surface of case 11 such as by swaging. The other end of lever 14 extends outward from case 11.

Spring 15 is formed by coiling a steel wire or a coil wire made of copper alloy. The top and bottom ends of slightly twisted spring 15 are locked onto rotating body 12 and the inner bottom surface of case 11, respectively. Spring 15 presses rotating body 12 to a predetermined angle to retain lever 14 in place.

Magnet 16 is a substantially rectangular solid made of ferrite or Nd—Fe—B alloy for example. This magnet 16 is fixedly attached to the top surface of rotating body 12 by bonding or insert molding for example so that its north and south poles point to the right and left directions (i.e. horizontal directions) and its center coincides with the rotation center of rotating body 12.

Wiring substrate 17 is a substrate such as a paper phenol substrate or a glass-containing epoxy substrate. Wiring substrate 17 has plural wiring patterns formed on its top and bottom surfaces using, for example, copper foil and is contained in the upper part of case 11 parallel with the top surface of rotating body 12.

Figure 3:
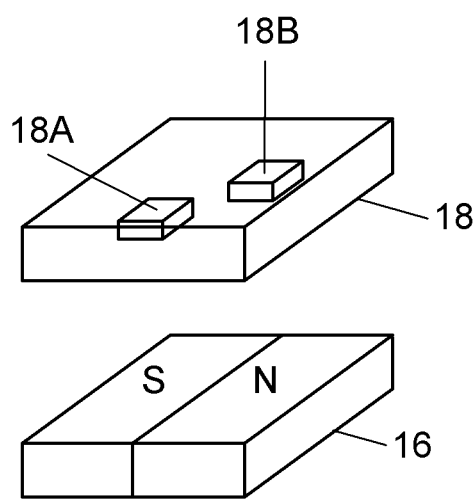
FIG. 3 is a partial perspective view of the device.

Angle sensor 18, as shown in FIG. 3, has magnetism detection elements 18A and 18B (e.g. Hall effect sensors, GMR elements) for detecting magnetism vertical to the detection plane, arranged at a predetermined angle interval (e.g. 90 degrees) with respect to the rotation center of magnet 16. Angle sensor 18 is implemented on the wiring pattern on the bottom surface of wiring substrate 17 directly above magnet 16 such as, for example, by soldering and is disposed facing magnet 16 with a predetermined clearance from magnet 16.

Figure 4:
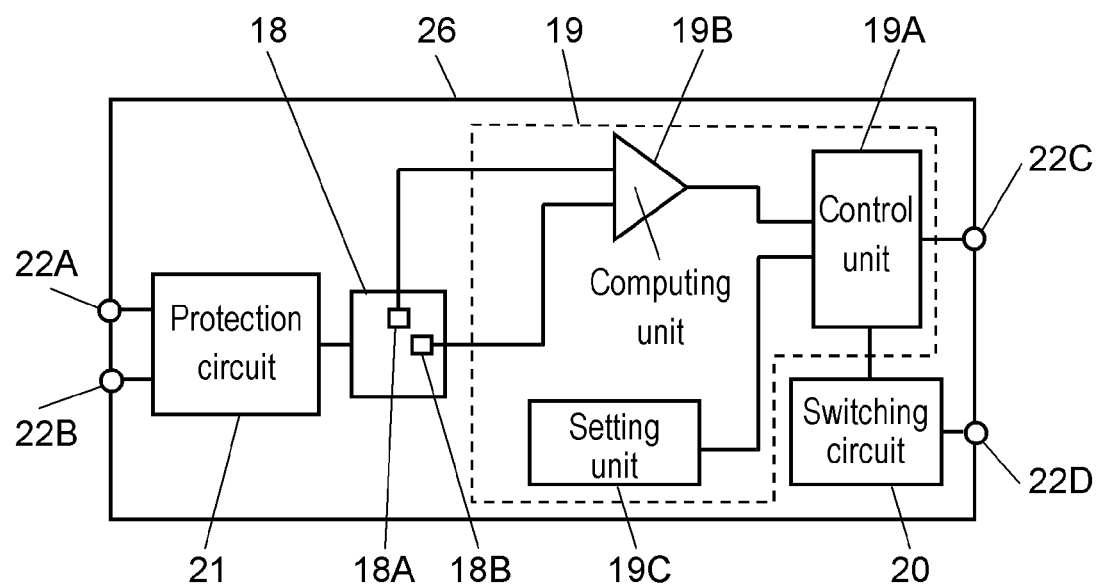
FIG. 4 is a block circuit diagram of the device.

The block circuit diagram of FIG. 4 shows a configuration of built-in circuit 26.

Built-in circuit 26 includes angle sensor 18, first control circuit 19, switching circuit 20, protection circuit 21, and terminals 22A through 22D.

First control circuit 19 is formed of control unit 19A such as a microprocessor, computing unit 19B such as an operational amplifier or comparator, and setting unit 19C such as a fixed or variable resistor, and is implemented on wiring substrate 17. Here, computing unit 19B is connected to magnetism detection elements 18A and 18B; computing unit 19B and setting unit 19C are connected to control unit 19A.

Switching circuit 20 switches, between on and off, a current flowing through, for example, a contact relay or a semiconductor (e.g. GaN, SiC) relay.

Protection circuit 21, formed of a varistor or Zener diode for example, protects against such as overvoltage. Switching circuit 20 is connected to control unit 19A; protection circuit 21 is connected to angle sensor 18.

Terminal 22 is formed substantially L-shaped and is made of a metal such as copper alloy. Terminal 22 is provided on the side surface of case 11 such as by insert molding. The respective one ends of plural terminals 22 become terminals 22A through 22D; the other ends extend into the inside of substantially square-cylindrical connector 11A. Terminals 22A and 22B are connected to protection circuit 21; terminal 22C, to control unit 19A; and terminal 22D, to switching circuit 20.

Cover 23 is made of a metal such as an iron plate. Cover 23 covers the top opening of case 11 and is fastened to the top surface of case 11 such as by swaging.

Figure 5:
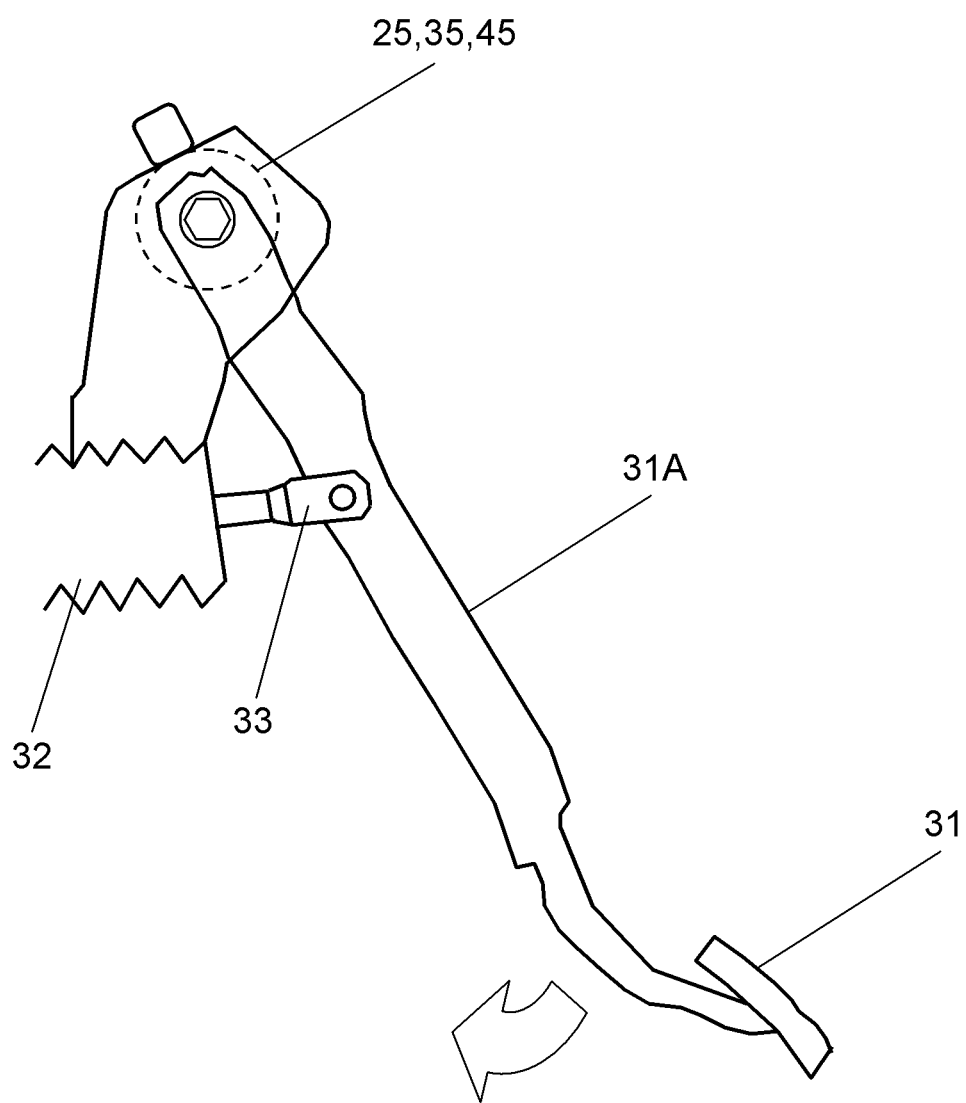
FIG. 5 is a side view showing a state where the device is attached to a brake pedal.

As shown in FIG. 5, rotation angle detecting device 25 is attached to arm 31A near the rotation shaft of automobile brake pedal 31. Terminals 22 are attached to the automobile through connectors and lead wires. Terminals 22A and 22B are connected to the power supply (e.g. battery) and the ground; terminal 22C, to the electronic circuit on the vehicle; and terminal 22D, to such as the stop lamp.

As shown in FIG. 5, in a state where brake pedal 31 is not being depressed, and thus brake pedal 31 is being supported frontward by push rod 33 projecting from the inside of cylinder body 32, switching circuit 20 connected to the stop lamp through terminal 22D is electrically disconnected. Consequently the stop lamp is turned off.

Next, a description is made of operation of rotation angle detecting device 25.

First, when brake pedal 31 is depressed, the rotation of brake pedal 31 causes lever 14 to swing and then rotating body 12 rotates to a predetermined angle (e.g. around 50 degrees) with spring 15 being twisted. Magnet 16 attached to the rotation center of rotating body 12 rotates as well, thereby changing the direction of a magnetic field of magnet 16. Magnetism detection elements 18A and 18B disposed facing each other directly above magnet 16 detect the change of the direction as change of strength and weakness of magnetism.

Figure 6A:
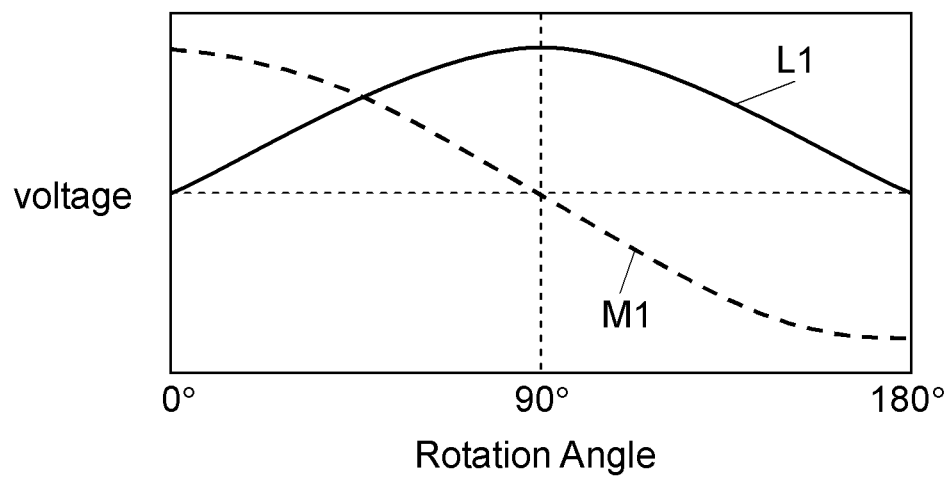
FIGS. 6A & 6B are waveform charts of the device.

Magnetism detection element 18A facing magnet 16 outputs sine-wave detection signal L1 as shown in FIG. 6A to computing unit 19B of first control circuit 19; magnetism detection element 18B disposed at a 90-degree interval from element 18A outputs cosine-wave detection signal M1 to computing unit 19B.

Figure 6B:
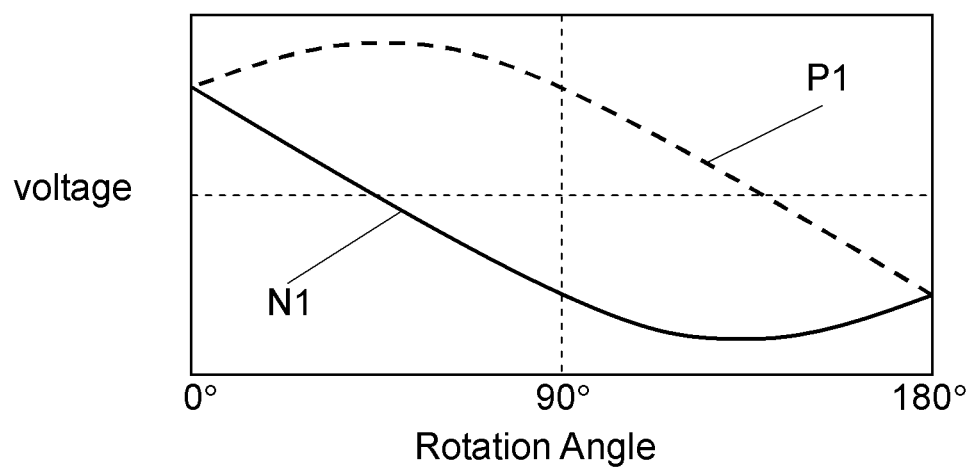

Further, computing unit 19B adds or subtracts detection signals L1 and M1. As shown in FIG. 6B, detection signal L1 is subtracted from detection signal M1 to determine computing signal N1; detection signal L1 is added to detection signal M1 to determine computing signal P1. Then, control unit 19A calculates a rotation angle of rotating body 12 (i.e. a step-on amount of brake pedal 31) from computing signal N1 or P1, and then outputs an angle signal to the electronic circuit on the automobile. The electronic circuit performs various types of control according to a step-on amount of brake pedal 31.

Computing signal N1 changes nearly straightly between 0 and around 60 degrees (a rotation angle of rotating body 12), which enables detecting a rotation angle with a high degree of accuracy. The rotation angle is an angle by which rotating body 12 rotates due to brake pedal 31 actually being depressed.

Next, when brake pedal 31 is slightly depressed and rotating body 12 enters a state rotated by a predetermined angle (e.g. 3 to around 10 degrees), first control circuit 19 detects this rotation angle. Control unit 19A outputs a predetermined switching signal to switching circuit 20, which electrically connects switching circuit 20 to light the stop lamp.

Next, when the foot is released from brake pedal 31, brake pedal 31 returns to its original position. Spring 15 attached between rotating body 12 and case 11 presses rotating body 12 to a predetermined angle; lever 14 returns to its original position; control unit 19A outputs a switching signal; switching circuit 20 enters a disconnected state; and the stop lamp is turned off.

To sum up, first control circuit 19 detects a rotation angle of rotating body 12 (i.e. a step-on amount of brake pedal 31) from change of magnetism of magnet 16 detected by magnetism detection elements 18A and 18B, and then outputs the rotation angle to the electronic circuit as an angle signal. First control circuit 19 outputs a switching signal according to the rotation angle of rotating body 12 to electrically contact and break switching circuit 20, which turns the stop lamp on and off.

That is, first control circuit 19 outputs a rotation angle of rotating body 12 to the electronic circuit as an angle signal according to change of magnetism detected by magnetism detection elements 18A and 18B to perform various types of control on the vehicle. First control circuit 19 outputs a switching signal to switching circuit 20 to turn the stop lamp on and off as well.

Hence, rotation angle detecting device 25 can detect a step-on amount of brake pedal 31 and can turn the stop lamp on and off with only one rotation angle detecting device 25 attached near the rotation shaft of brake pedal 31. This structure requires no other parts (e.g. push switch) for turning the stop lamp on and off.

That is to say, rotation angle detecting device 25 uses a small number of parts with a simple, inexpensive structure and can be attached to brake pedal 31 fast and easily.

Further, first control circuit 19 performs addition and subtraction on detection signals L1 and M1 output from magnetism detection elements 18A and 18B, and detects a rotation angle of rotating body 12 using computing signal N1 or P1 (nearly straight between 0 to around 60 degrees). This operation enables detecting a rotation angle with a small error and a high degree of accuracy.

Next, a description is made of rotation angle detecting device 35 according to another exemplary embodiment of the present invention.

Rotation angle detecting device 35 can detect a rotation angle highly accurately and reliably even if a detection signal from magnetism detection elements 18A and 18B contains an error due to change of the ambient temperature, compared to rotation angle detecting device 25 described above.

Figure 7:
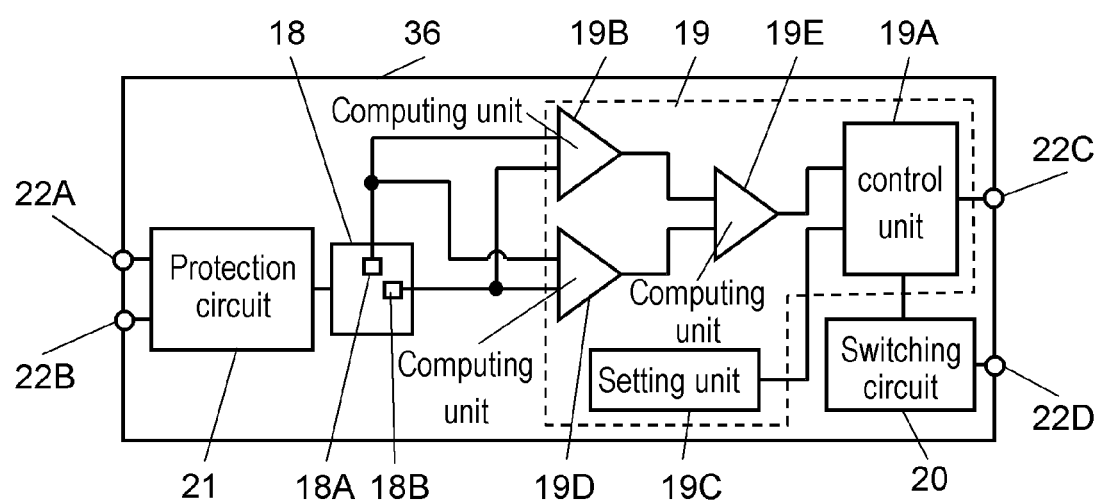
FIG. 7 is a block circuit diagram of another rotation angle detecting device according to the embodiment of the present invention.

Rotation angle detecting device 35 is mainly different from device 25 in that built-in circuit 36 is used instead of built-in circuit 26 used in device 25. FIG. 7 is a block circuit diagram of built-in circuit 36 used for device 35.

Built-in circuit 36 includes magnetism detection elements 18A and 18B, first control circuit 19, switching circuit 20, protection circuit 21, and terminals 22A through 22D.

First control circuit 19 includes control unit 19A, computing units 19B, 19D, and 19E, and setting unit 19C.

Setting unit 19C of first control circuit 19 is connected to control unit 19A; terminals 22A and 22B, to protection circuit 21; terminal 22C, to control unit 19A; and terminal 22D, to switching circuit 20.

Magnetism detection elements 18A and 18B are connected to computing unit 19B and to computing unit 19D.

Computing units 19B and 19D are connected to computing unit 19E; computing unit 19E, to control unit 19A.

As shown in FIGS. 1 through 3, built-in circuit 36 is implemented on wiring substrate 17 directly above magnet 16 fixedly attached to the rotation center of rotating body 12. Magnetism detection elements 18A and 18B are disposed facing magnet 16 with a predetermined clearance from magnet 16.

As shown in FIG. 5, rotation angle detecting device 35 is attached to arm 31A near the rotation shaft of automobile brake pedal 31. Terminals 22 are connected to such as the power supply, the ground, the electronic circuit on the vehicle, and the stop lamp through connectors and lead wires, and attached to the automobile.

Next, a description is made of operation of rotation angle detecting device 35.

First, when brake pedal 31 is depressed, the rotation of brake pedal 31 causes lever 14 to swing, and then rotating body 12 rotates to a predetermined angle (e.g. around 50 degrees) with spring 15 being twisted. Magnet 16 attached to the rotation center of rotating body 12 rotates, thereby changing the direction of a magnetic field of magnet 16. Magnetism detection elements 18A and 18B disposed facing each other directly above magnet 16 detect the change of the direction as change of strength and weakness of magnetism.

Figure 8A:
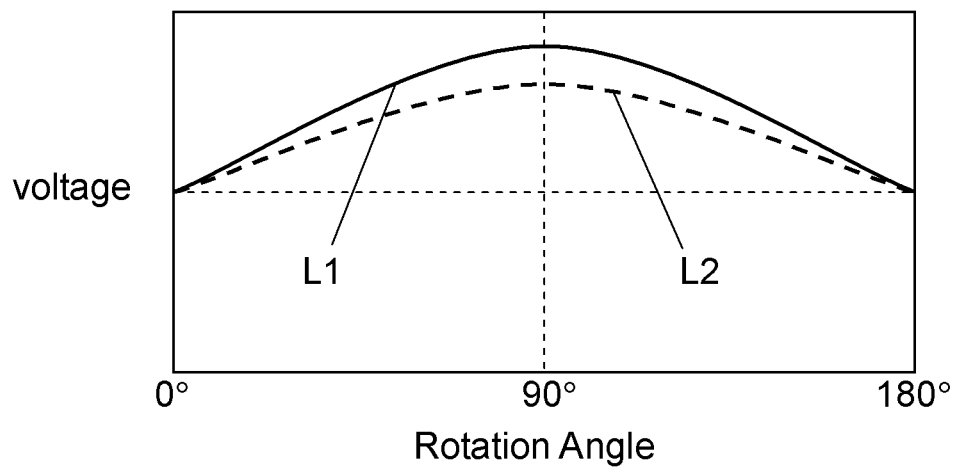
FIGS. 8A & 8B are waveform charts of the rotation angle detecting device.
Figure 8B:
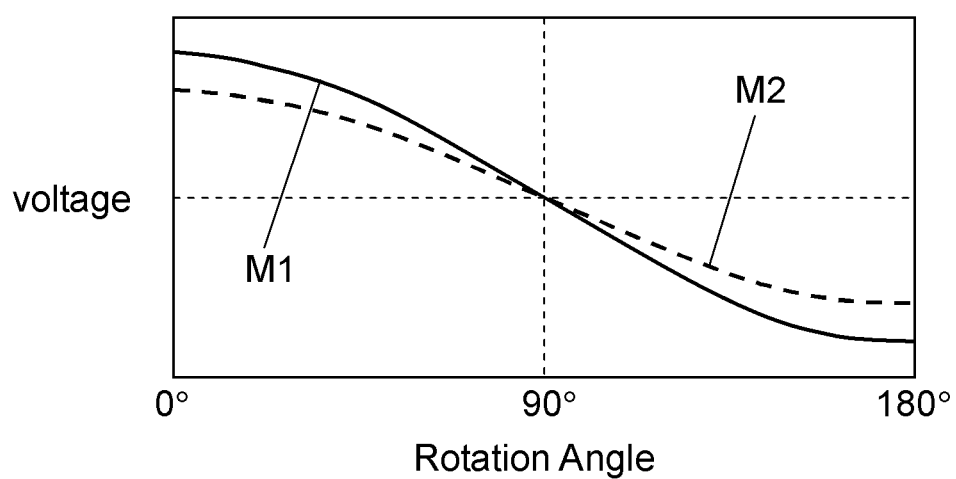

Magnetism detection element 18A facing magnet 16 outputs sine-wave detection signal L1 as shown in FIG. 8A to computing unit 19B of first control circuit 19; magnetism detection element 18B disposed at a 90-degree interval from element 18A outputs cosine-wave detection signal M1 as shown in FIG. 8B to computing unit 19D.

In this situation, if the ambient temperature at which rotation angle detecting device 35 is used becomes extremely high or low (i.e. not room temperature), high for instance, a detection signal output from magnetism detection element 18A or 18B changes to such as detection signal L2 or M2, which are then output to computing units 19B and 19D.

Figure 9A:
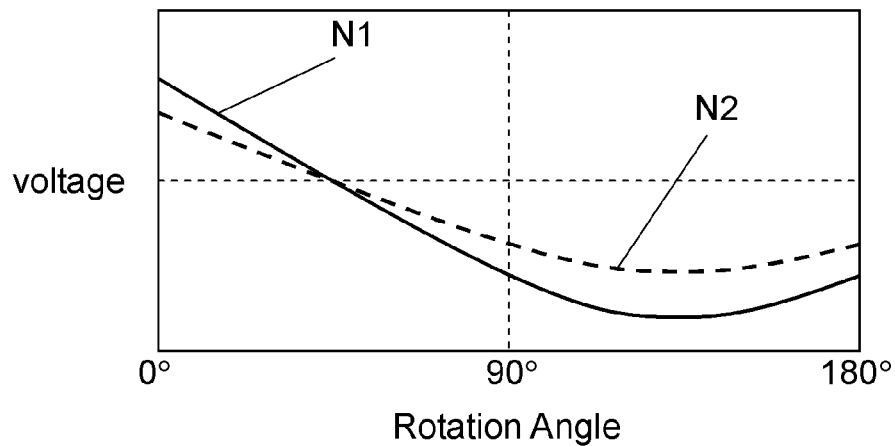
FIGS. 9A-9C are waveform charts of the device.
Figure 9B:
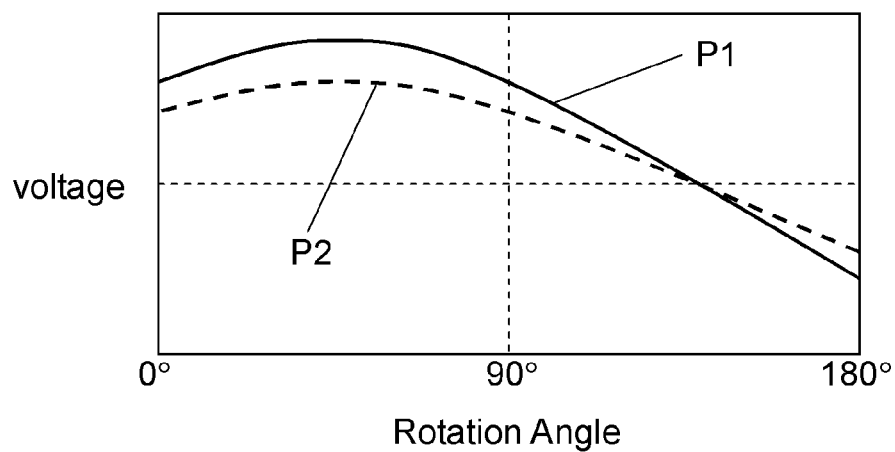

Hence, as depicted in FIGS. 9A-9B, when performing addition or subtraction on detection signals L2 and M2, computing units 19B and 19D do not produce computing signal N1 (detection signal L1 is subtracted from detection signal M1, free from an error at room temperature) or computing signal P1 (detection signal L1 is added to detection signal M1), but inaccurate computing signal N2 or P2.

In rotation angle detecting device 35, however, computing signal N2 or P2 is not directly output to control unit 19A, but is output from computing units 19B and 19D to computing unit 19E and is divided in computing unit 19E.

Figure 9C:
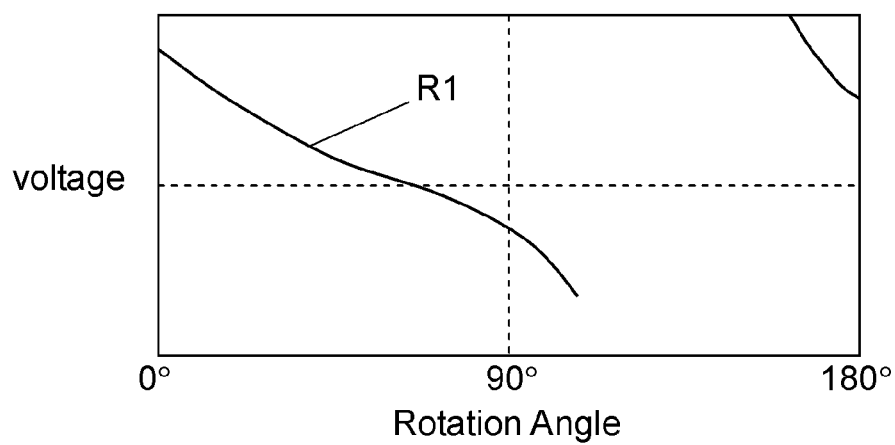

Computing signal R1 shown in FIG. 9C is determined by dividing computing signal N2 (detection signal L2 is subtracted from detection signal M2) by computing signal P2 (detection signal L2 is added to detection signal M2). Computing unit 19E outputs computing signal R1 to control unit 19A. Control unit 19A calculates a rotation angle of rotating body 12, namely a step-on amount of brake pedal 31, from computing signal R1. This angle signal is output to the electronic circuit on the automobile to perform various types of control on the vehicle according to a step-on amount.

That is, even if a detection signal output from magnetism detection element 18A or 18B changes to detection signal L2 or M2 due to change of the ambient temperature, computing units 19B and 19D perform addition and subtraction on detection signal L2 or M2, and then computing unit 19E performs division on the result to determine computing signal R1.

Herewith, control unit 19A detects a rotation angle using computing signal R1, which is nearly straight particularly from 0 to around 90 degrees, thereby enabling detection free from an error with a high degree of accuracy.

When brake pedal 31 is slightly depressed and rotating body 12 enters a state rotated by a predetermined angle (e.g. 3 to around 10 degrees), first control circuit 19 detects this rotation angle, and then control unit 19A outputs a predetermined switching signal to switching circuit 20, which electrically connects switching circuit 20 to light the stop lamp.

When the foot is released from brake pedal 31, switching circuit 20 is disconnected to turn off the stop lamp.

Further, a description is made of rotation angle detecting device 45 according to another exemplary embodiment.

Rotation angle detecting device 45 has a feature of reducing battery consumption in addition to the features of device 25.

Figure 10:
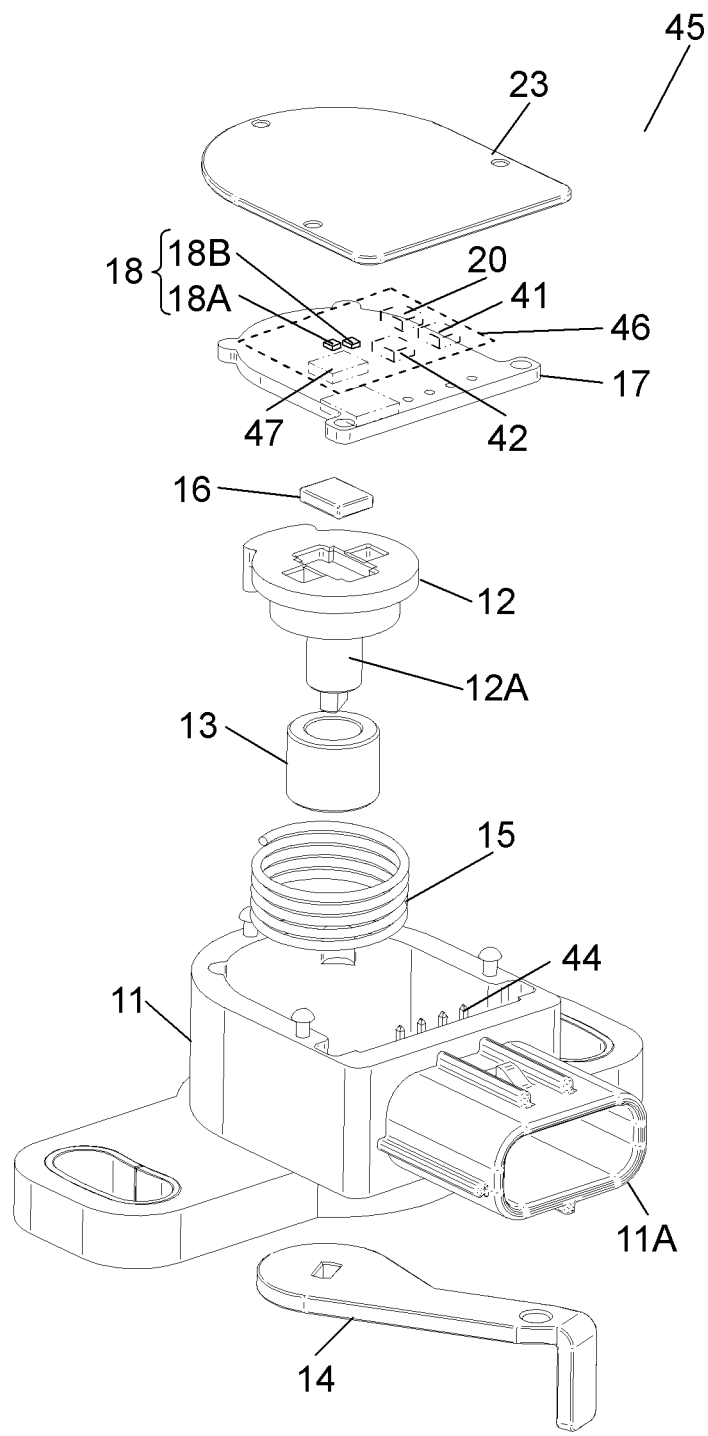
FIG. 10 is an exploded perspective view of the device.

FIG. 10 is an exploded perspective view of rotation angle detecting device 45.

Rotation angle detecting device 45 is mainly different from device 25 in that built-in circuit 46 is used instead of built-in circuit 26 used in device 25.

Built-in circuit 46 includes magnetism sensor 18 having magnetism detection elements 18A and 18B, switching circuit 20, protection circuit 21, first control circuit 41, second control circuit 42, terminal 44, and switching circuit 47.

Figure 11:
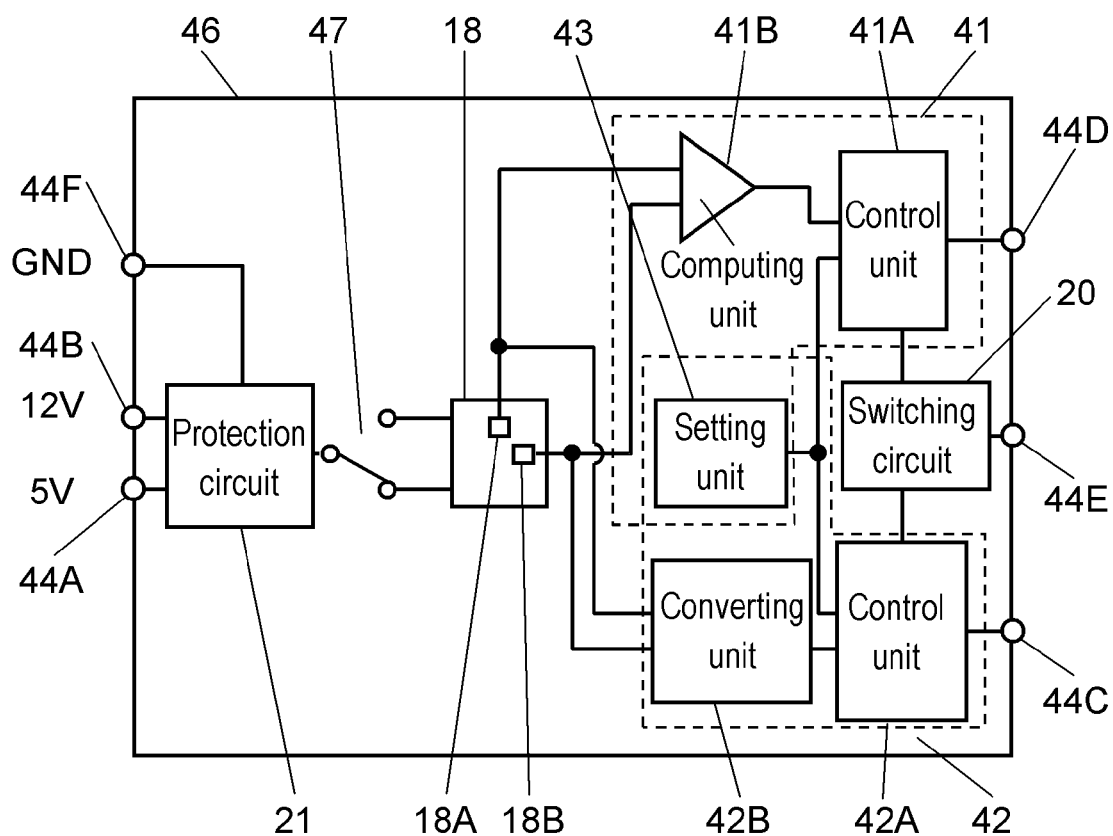
FIG. 11 is a block circuit diagram of the device.

FIG. 11 is a block circuit diagram of built-in circuit 46 used for rotation angle detecting device 45.

First control circuit 41 includes control unit 41A such as an operational amplifier or comparator; computing unit 41B such as an operational amplifier or comparator; and setting unit 43 such as a fixed or variable resistor or a memory storing a predetermined reference value.

Second control circuit 42 includes control unit 42A such as a microprocessor, converting unit 42B such as an A/D converter, setting unit 43 such as a fixed or variable resistor or a memory storing a predetermined reference value. Here, setting unit 43 may be shared by first control circuit 41 and second control circuit 42 or may be provided separately.

Converting unit 42B is connected to magnetism detection elements 18A and 18B; converting unit 42B and setting unit 43 are connected to control unit 42A.

Computing unit 41B is connected to magnetism detection elements 18A and 18B; computing unit 41B and setting unit 43 are connected to control unit 41A.

Switching circuit 20 is connected to control units 42A and 41A; protection circuit 21 is connected to angle sensor 18 through switching circuit 47.

Terminal 44, formed substantially L-shaped made of a metal such as copper alloy, is provided on the side surface of case 11 such as by insert molding. One end of terminal 44 becomes terminals 44A through 44F; the other end extends into the inside of substantially square-cylindrical connector 11A. Terminals 44A and 44B are connected to protection circuit 21; terminals 44C and 44D, to control units 42A and 41A; terminal 44E, to switching circuit 20; and terminal 44F, to the ground potential.

As shown in FIG. 5, rotation angle detecting device 45 is attached to arm 31A near the rotation shaft of automobile brake pedal 31. Terminal 44 of rotation angle detecting device 45 is connected to the vehicle through connectors and lead wires. For example, terminal 44A is connected to a 5-volt electronic circuit on the vehicle; terminal 44B, to a 12-V battery; terminals 44C and 44D, to an electronic circuit; and terminal 44E, to such as a stop lamp.

As shown in FIG. 5, in a state where brake pedal 31 is not being depressed, namely brake pedal 31 is being supported frontward by push rod 33 projecting from the inside of cylinder body 32, switching circuit 20 connected to the stop lamp through terminal 44E is electrically disconnected. Consequently the stop lamp is turned off.

At this moment, in a state where such as an ignition switch has been turned on and the engine of the vehicle has been started, a 5-V voltage is being applied to terminal 44A from the electronic circuit, thereby causing switching circuit 47 to switch to second control circuit 42, which is being supplied with a 5-V voltage.

Next, a description is made of operation of rotation angle detecting device 45 in a state where second control circuit 42 is being supplied with a 5-V voltage.

First, when brake pedal 31 is depressed, the rotation of brake pedal 31 causes lever 14 to swing, and then rotating body 12 rotates to a predetermined angle (e.g. around 50 degrees) with spring 15 being twisted. Magnet 16 attached to the rotation center rotates as well, thereby changing the direction of a magnetic field of magnet 16. Magnetism detection elements 18A and 18B disposed facing each other directly above magnet 16 detect the change of the direction as change of strength and weakness of magnetism.

Figure 12A:
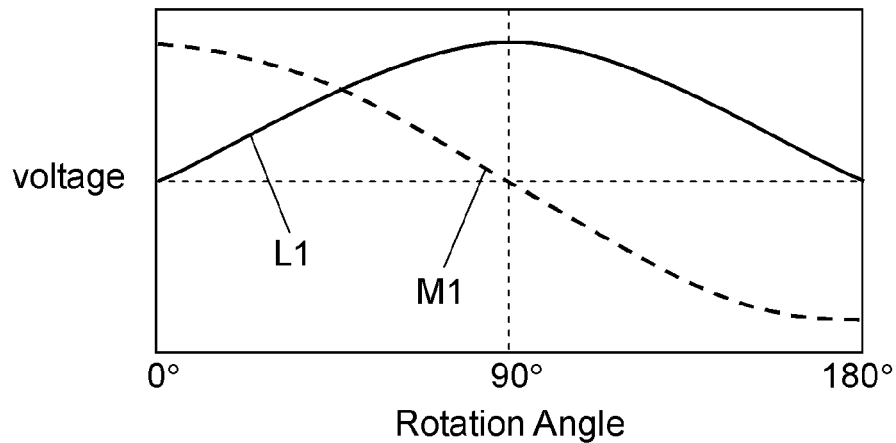
FIG. 12A-12C are waveform charts of the device.

Magnetism detection element 18A facing magnet 16 outputs sine-wave detection signal L1 as shown in the waveform chart of FIG. 12A to converting unit 42B of second control circuit 42; magnetism detection element 18B disposed at a 90-degree interval from element 18A outputs cosine-wave detection signal M1 to converting unit 42B.

Converting unit 42B converts detection signals L1 and M1 from analog to digital.

Control unit 42A performs division on the digital signal converted by converting unit 42B.

Figure 12B:
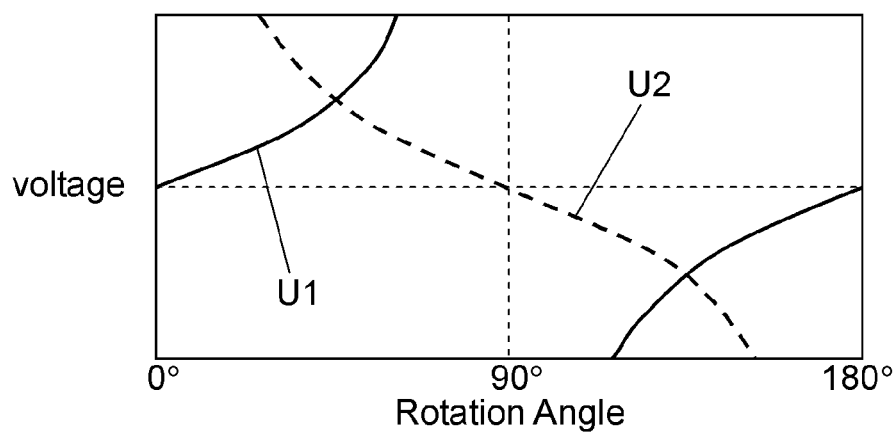

For example, as shown in FIG. 12B, control unit 42A divides detection signal L1 by detection signal M1 to produce tangent-wave computing signal U1, and divides detection signal M1 by detection signal L1 to produce computing signal U2 (the inverse number of computing signal U1).

Figure 12C:
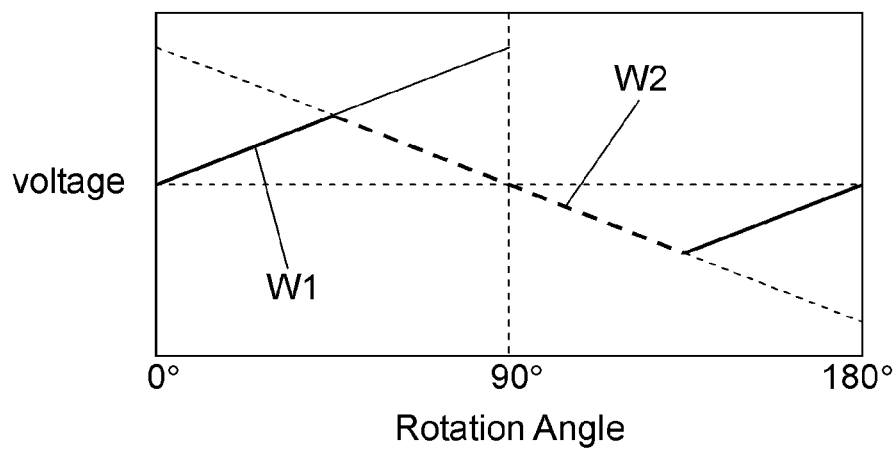

Control unit 42A converts computing signals U1 and U2 to their inverse functions, which are straight-shaped conversion signals W1 and W2 as shown in FIG. 12C.

Control unit 42A calculates a rotation angle of rotating body 12, namely a step-on amount of brake pedal 31, from conversion signals W1 and W2, and from polarity and magnitude correlation between detection signals L1 and M1. An angle signal representing a rotation angle of rotating body 12 is output from terminal 44C to the electronic circuit on the automobile to perform various types of control according to a step-on amount.

To sum up, control unit 42A divides detection signals L1 and M1 from magnetism detection elements 18A and 18B, and then converts the results to their inverse functions to produce conversion signals W1 and W2 that change nearly straightly. Conversion signals W1 and W2 change nearly straightly with respect to a rotation angle of rotating body 12, which enables detecting a rotation angle with a high degree of accuracy.

Next, when brake pedal 31 is slightly depressed, rotating body 12 enters a state rotated by a predetermined angle (e.g. 3 to around 10 degrees).

Second control circuit 42 detects this rotation angle. Control unit 42A outputs a predetermined switching signal to switching circuit 20, which electrically connects switching circuit 20 to light the stop lamp.

Next, when the foot is released from brake pedal 31, brake pedal 31 returns to its original position. Spring 15 attached between rotating body 12 and case 11 presses rotating body 12 to a predetermined angle; lever 14 returns to its original position. At this moment, control unit 42A outputs a switching signal; switching circuit 20 enters a disconnected state; and the stop lamp is turned off.

To sum up, in a state where the engine has been started and switching circuit 47 has been switched to second control circuit 42, second control circuit 42 detects a rotation angle of rotating body 12, namely a step-on amount of brake pedal 31, from change of magnetism of magnet 16 detected by magnetism detection elements 18A and 18B, and then outputs the result as an angle signal to the electronic circuit. Simultaneously, second control circuit 42 outputs a switching signal according to the step-on amount of brake pedal 31 to contact and break switching circuit 20, thereby turning the stop lamp on and off.

Approximately 10-mA current flows through converting unit 42B that converts detection signals L1 and M1 from magnetism detection elements 18A and 18B from analog to digital. Approximately 15-mA (relatively large) current flows through control unit 42A that divides signals L1 and M1 to produce computing signals U1 and U2 and then converts the results to conversion signals W1 and W2 (inverse functions).

Meanwhile, in a state where, for example, an ignition switch has been turned off and the engine of the vehicle has been stopped, terminal 44A is not supplied with a voltage from the electronic circuit and terminal 44B is supplied with a 12-V voltage from the battery. Switching circuit 47 detects this state to switch to first control circuit 41.

Next, a description is made of operation of rotation angle detecting device 45 in a case where first control circuit 41 is supplied with a 12-V voltage.

Even when brake pedal 31 is depressed with the engine in a stopped state, magnetism detection elements 18A and 18B detect strength and weakness of magnetism of magnet 16 caused by rotation of rotating body 12. To detect a rotation angle, first control circuit 41 is used.

Here, the procedure for detecting a rotation angle of rotating body 12 is the same as that in rotation angle detecting device 25 described above, and is described using FIGS. 6A and 6B.

Magnetism detection element 18A facing magnet 16 outputs sine-wave detection signal L1 as shown in FIG. 6A to computing unit 41B of first control circuit 41; magnetism detection element 18B disposed at a 90-degree interval from element 18A outputs cosine-wave detection signal M1 to computing unit 41B.

Then, computing unit 41B performs addition or subtraction on detection signals L1 and M1. For example, as shown in FIG. 6B, computing unit 41B subtracts detection signal L1 from detection signal L2 to determine computing signal N1; adds detection signal L1 to detection signal L2 to determine computing signal P1. Control unit 41A calculates a rotation angle of rotating body 12, namely a step-on amount of brake pedal 31, from computing signal N1 or P1. An angle signal is output from terminal 44D to the electronic circuit to perform various types of control on the vehicle according to a step-on amount.

Computing signal N1 changes nearly straightly from 0 to around 60 degrees, which is an angle range in which brake pedal 31 is depressed actually and rotating body 12 rotates, and thus a rotation angle can be detected with a high degree of accuracy within this range.

When brake pedal 31 is slightly depressed and rotating body 12 enters a state rotated by a predetermined angle (e.g. 3 to around 10 degrees), first control circuit 41 detects this rotation angle, and then control unit 41A outputs a predetermined switching signal to switching circuit 20, which electrically connects switching circuit 20 to light the stop lamp.

Further, when the foot is released from the brake pedal 31, brake pedal 31 is supported by push rod 33 and returns to its original position. Spring 15 presses rotating body 12 to a predetermined angle, and lever 14 returns to its original position. Control unit 41A outputs a predetermined switching signal to disconnect switching circuit 20, and the stop lamp turns off.

To sum up, when the engine stops, switching circuit 47 switches to first control circuit 41. First control circuit 41 detects a rotation angle of rotating body 12, namely a step-on amount of brake pedal 31, from change of magnetism of magnet 16 detected by magnetism detection elements 18A and 18B, and then outputs the result as an angle signal to the electronic circuit. Simultaneously, first control circuit 41 outputs a switching signal according to the rotation angle of rotating body 12 to contact and break switching circuit 20, thereby turning the stop lamp on and off.

At this moment, only a small current (around 20 μA) flows through computing unit 41B of first control circuit 41 that performs addition or subtraction on detection signals L1 and M1 output from magnetism detection elements 18A and 18B; and through control unit 41A that detects a rotation angle from computing signal N1 or P1 determined. Consequently, battery consumption can be reduced when the engine is at a stop. Simultaneously, a rotation angle can be detected with a relatively high degree of accuracy while brake pedal 31 is actually being depressed by detecting a rotation angle from nearly straight computing signal N1 or P1.

That is, in rotation angle detecting device 45, switching circuit 47 switches to second control circuit 42 while the engine is running, which enables detecting a rotation angle with a high degree of accuracy owing to second control circuit 42 using a relatively large current. When the engine is at a stop, switching circuit 47 switches to first control circuit 41, which reduces battery consumption and enables detecting a rotation angle reliably through detecting a rotation angle by first control circuit 41 using a small current.

Rotation angle detecting device 45 outputs the rotation angle of rotating body 12 to the electronic circuit as an angle signal, and simultaneously outputs a predetermined switching signal according to the step-on amount of brake pedal 31 to electrically contact and break switching circuit 20, thereby turning the stop lamp on and off.

First control circuit 41 and second control circuit 42 compute or convert detection signals L1 and M1 from magnetism detection elements 18A and 18B, and detect a rotation angle of rotating body 12 using straight conversion signal W1 or W2 or nearly straight computing signal N1 or P1, thereby enabling detecting a rotation angle with a small error and a high degree of accuracy.

Switching circuit 47 switches to first control circuit 41, and when detecting a rotation angle using a battery, switching circuit 47 switches between 12 V and 0 V at predetermined time intervals. What is called an intermittent action can further reduce battery consumption.

Further, a description is made of rotation angle detecting device 65 according to another embodiment.

Figure 13:
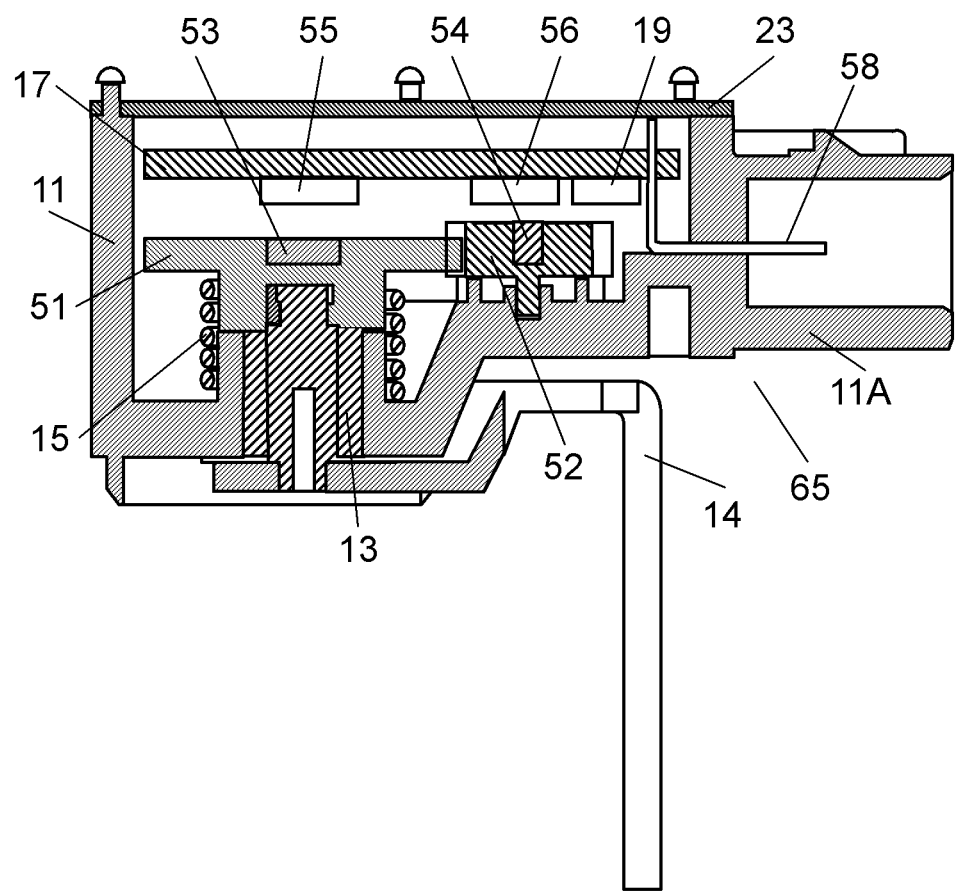
FIG. 13 is a sectional view of the device.
Figure 14:
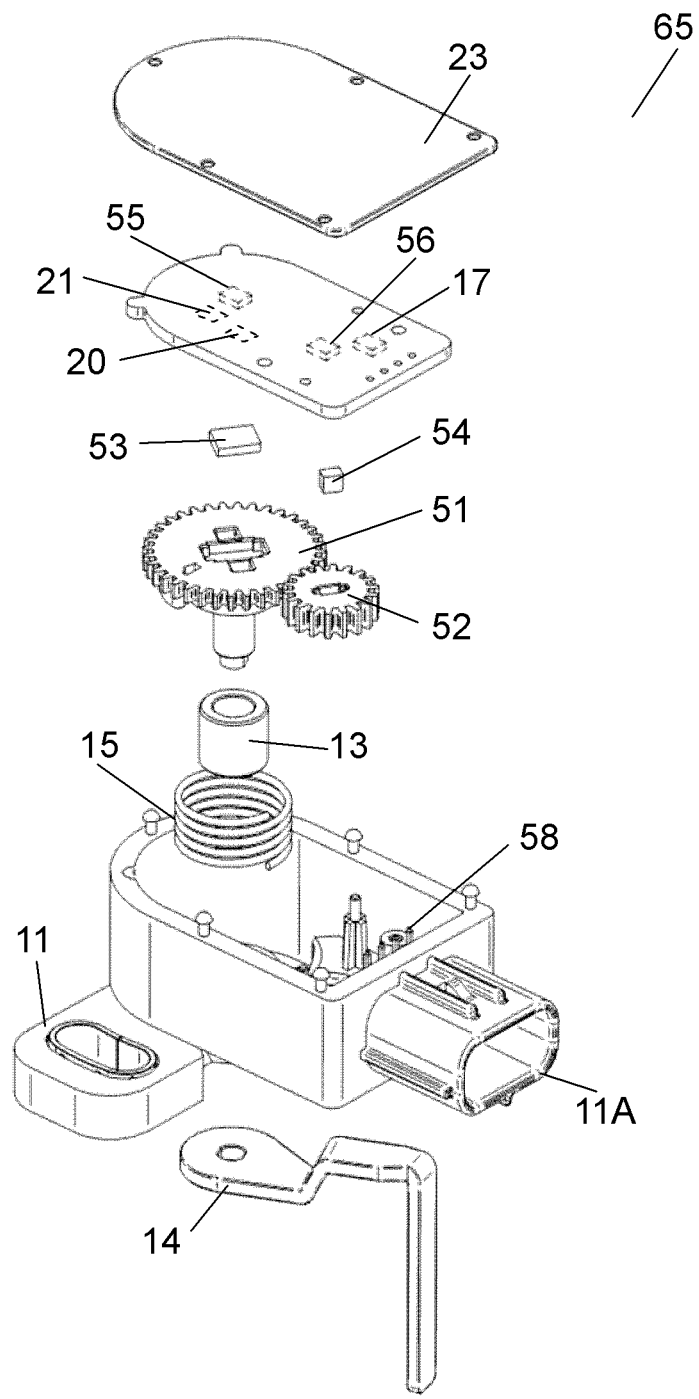
FIG. 14 is an exploded perspective view of the device.

FIG. 13 is a sectional view of rotation angle detecting device 65. FIG. 14 is an exploded perspective view of device 65.

Rotation angle detecting device 65 is mainly different from device 25 in the following points. Device 65 includes main rotating body 51 and auxiliary rotating body 52 rotating in conjunction with main rotating body 51, instead of rotating body 12; main magnet 53 and auxiliary magnet 54, instead of magnet 16; main angle sensor 55 and auxiliary angle sensor 56, instead of angle sensor 18; and terminal 58, instead of terminal 22.

Rotation angle detecting device 65 can detect a rotation angle of main rotating body 51 using main angle sensor 55 and auxiliary angle sensor 56, and thus can advantageously perform either outputting an angle signal or controlling on and off of the stop lamp even if either sensor 55 or sensor 56 is in failure.

Next, each component is described.

Main rotating body 51 is a gear wheel having cogs on its outer edge with a predetermined pitch. Auxiliary rotating body 52 is a gear wheel having cogs on its outer edge with nearly the same pitch as main rotating body 51. Body 51 and body 52 rotate in conjunction with each other with each cog being engaged. The diameter of body 52 is smaller than that of body 51. Consequently, when body 51 and body 52 rotate in conjunction with each other, body 52 rotates more than body 51.

Main magnet 53 and auxiliary magnet 54 are substantially rectangular solids made of ferrite or Nd—Fe—B alloy, for example. Main magnet 53 is disposed at the rotation center of main rotating body 51; auxiliary magnet 54 is disposed at the rotation center of auxiliary rotating body 52. Magnets 53 and 54 have south and north poles horizontally, where the left end is the south pole and the right is north, for example. Magnets 53 and 54 rotate according to rotation of rotating bodies 51 and 52, respectively.

Main angle sensor 55 is disposed facing main magnet 53 with a predetermined clearance from main magnet 53; auxiliary angle sensor 56 is disposed facing auxiliary magnet 54 with a predetermined clearance from auxiliary magnet 54. Here, sensor 55 has main magnetism detection elements 55A and 55B (e.g. Hall effect sensors, GMR elements) for detecting magnetism vertical to the detection plane, arranged at a predetermined angle interval (e.g. 90 degrees) with respect to the rotation center of main magnet 53. In the same way, auxiliary angle sensor 56 has auxiliary magnetism detection elements 56A and 56B arranged at a predetermined angle interval (e.g. 90 degrees).

Figure 15:
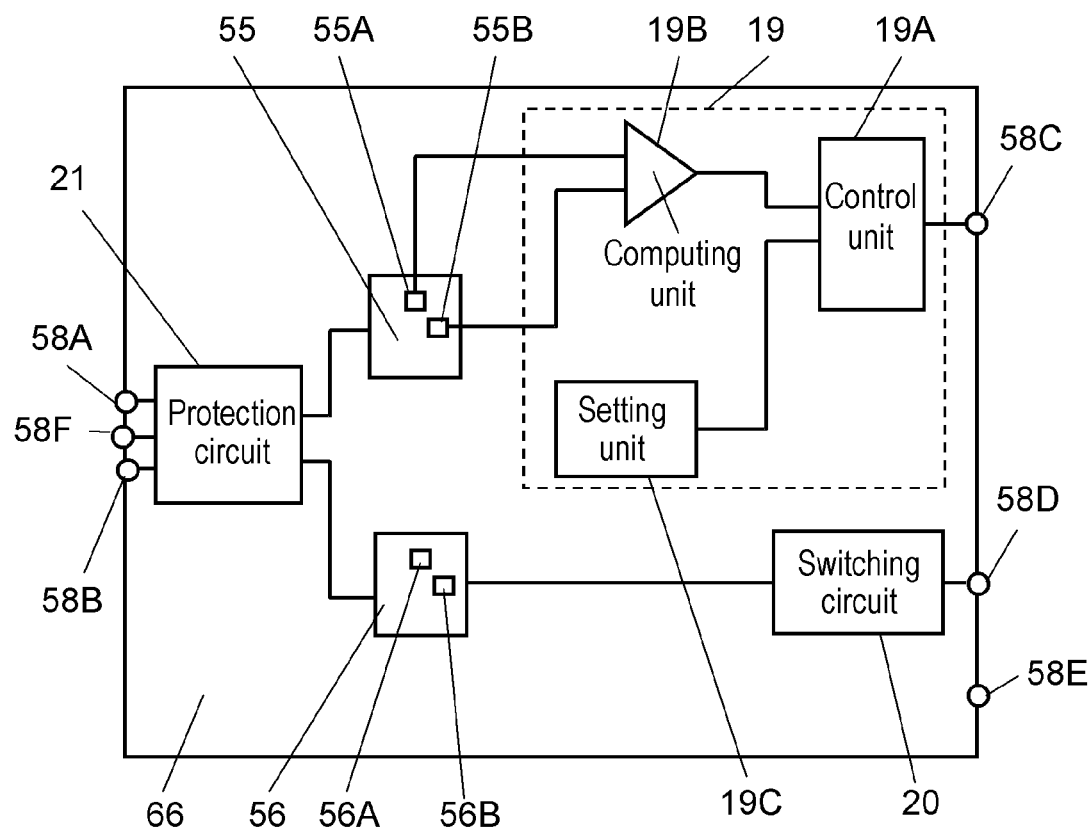
FIG. 15 is a block circuit diagram of the device.

FIG. 15 shows a configuration of built-in circuit 66.

Built-in circuit 66 includes main angle sensor 55, auxiliary angle sensor 56, first control circuit 19, switching circuit 20, protection circuit 21, and terminals 58A through 58F becoming one end of terminal 58.

Setting unit 19C of first control circuit 19 is connected to control unit 19A; terminals 58A, 58B, and 58F, to protection circuit 21; terminal 58C, to control unit 19A; and terminal 58D, to switching circuit 20. Terminal 58E is not connected.

Protection circuit 21 is connected to main angle sensor 55 and auxiliary angle sensor 56, and supplies power to main angle sensor 55 and auxiliary angle sensor 56. Terminal 58A is connected to a 5-V electronic circuit on the vehicle; terminal 58B, to a 12-V battery; and terminal 58F, to the ground potential. Main angle sensor 55 is supplied with a 5-V voltage; auxiliary angle sensor 56, with a 12-V voltage.

Main angle sensor 55 includes main magnetism detection elements 55A and 55B, to which computing unit 19B is connected. A detection signal output from main magnetism detection elements 55A and 55B is input to computing unit 19B. First control circuit 19 outputs an angle signal to terminal 58C according to a detection signal output from main angle sensor 55. First control circuit 19 may include or replace the configuration of the second control circuit that performs such as division on a detection signal.

First control circuit 19 does not output a switching signal, unlike first control circuit 19 of detecting device 25; otherwise, first control circuit 19 performs the same processes as those by first control circuit 19 of detecting device 25.

Auxiliary angle sensor 56 includes auxiliary magnetism detection elements 56A and 56B, which are connected to switching circuit 20. A detection signal output from auxiliary magnetism detection elements 56A and 56B is input into switching circuit 20, which then switches between an electrically connected state and not, thereby turning the stop lamp on and off.

Auxiliary angle sensor 56 operates at a voltage higher than first control circuit 19 and main angle sensor 55; however, its operating current is as small as less than 300 microamperes, thereby enabling control of lighting a stop lamp with a low power.

Figure 16:
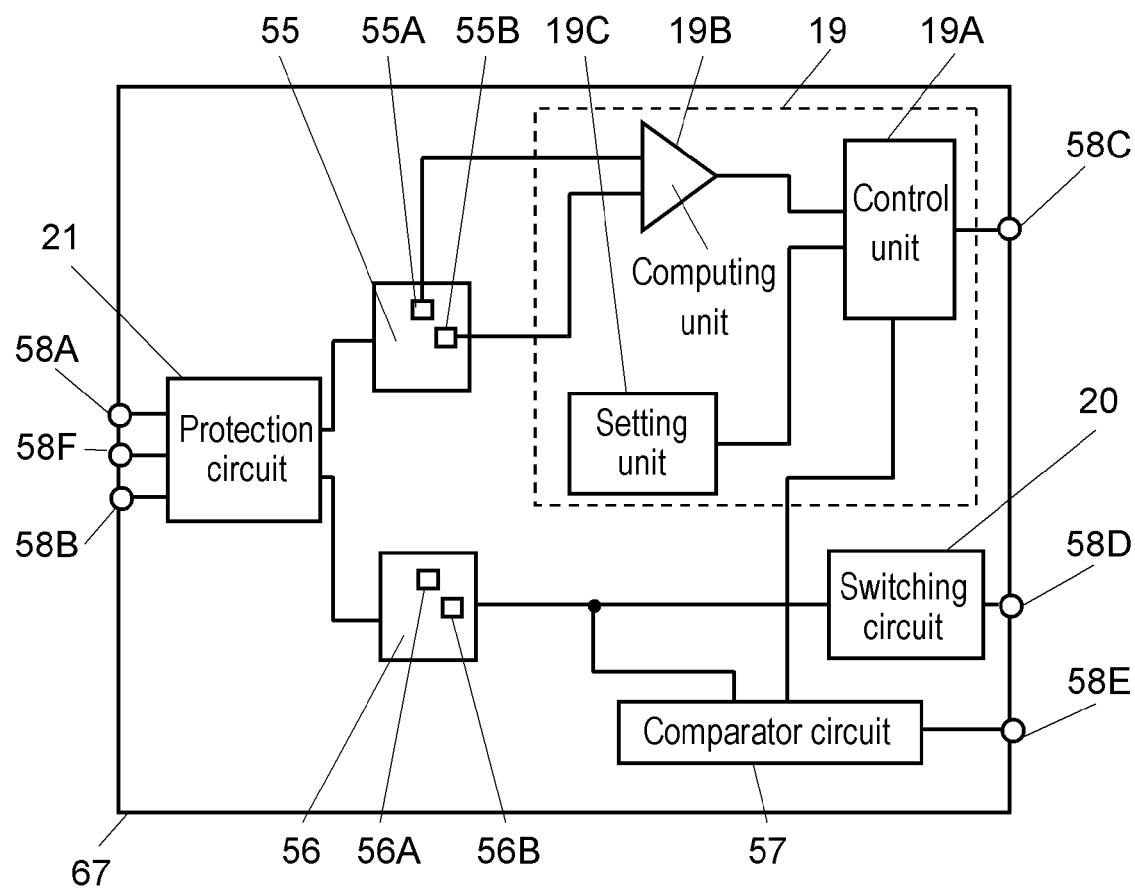
FIG. 16 is a block circuit diagram of the device.

Instead, configuration may be made as built-in circuit 67 of FIG. 16.

Built-in circuit 67 has circuit 57 added to built-in circuit 66. Comparator circuit 57 enables determining that either main angle sensor 55 or auxiliary angle sensor 56 is in failure. First control circuit 19 of built-in circuit 67 outputs a switching signal, unlike first control circuit 19 of built-in circuit 67.

Comparator circuit 57 is connected to auxiliary angle sensor 56, first control circuit 19, and terminal 58E. Circuit 57 receives a switching signal from first control circuit 19 and a detection signal output from auxiliary angle sensor 56 as input.

Comparator circuit 57 compares the switching signal with the detection signal output from auxiliary angle sensor 56, and determines that both main angle sensor 55 and auxiliary angle sensor 56 are normal if the signals have predetermined relationship.

Meanwhile, if the signals do not have predetermined relationship, comparator circuit 57 determines that either main angle sensor 55 or auxiliary angle sensor 56 is in failure, and outputs a notice signal from terminal 58E. The determination is made using a predetermined reference value stored in setting unit 19C of first control circuit 19 of built-in circuit 67. Alternatively, a logical circuit for example in comparator circuit 57 may be used. Here, comparator circuit 57 may be built into first control circuit 19.

Rotation angle detecting devices 25, 35, 45, and 65 may be reconfigured as the following.

Instead of magnetism detection elements 18A and 18B (e.g. Hall effect sensors, GMR elements) for detecting vertical magnetism, arranged at an angle interval of 90 degrees, such as AMR (anisotropic magnetoresistance) elements that detect horizontal magnetism, arranged at an angle interval of 45 degrees may be used.

Figure 17:
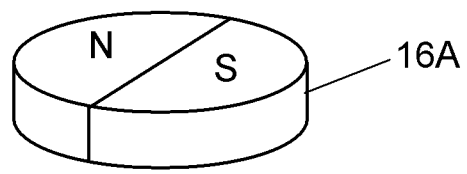
FIG. 17 is a perspective view of part of the device.

As shown in FIG. 17, instead of magnet 16, magnet 16A substantially column-shaped with its north and south poles formed horizontally may be used.

Figure 18:
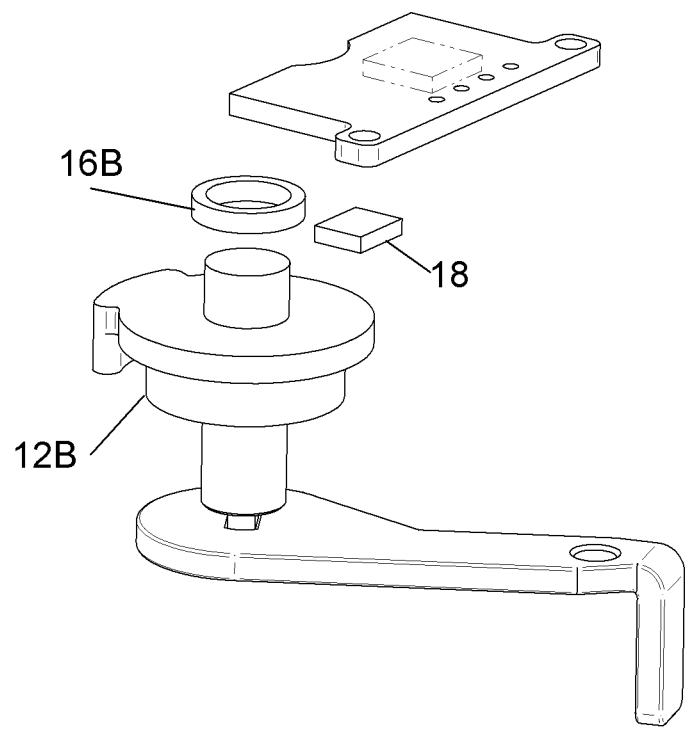
FIG. 18 is a partial exploded perspective view of the device.

As shown in FIG. 18, the following configuration may be used. That is, magnet 16B substantially ring-shaped with its north and south poles formed horizontally is used, and is fixedly attached onto the top surface of rotating body 12B so that the center of magnet 16B coincides with the rotation center of rotating body 12B.

Figure 19:
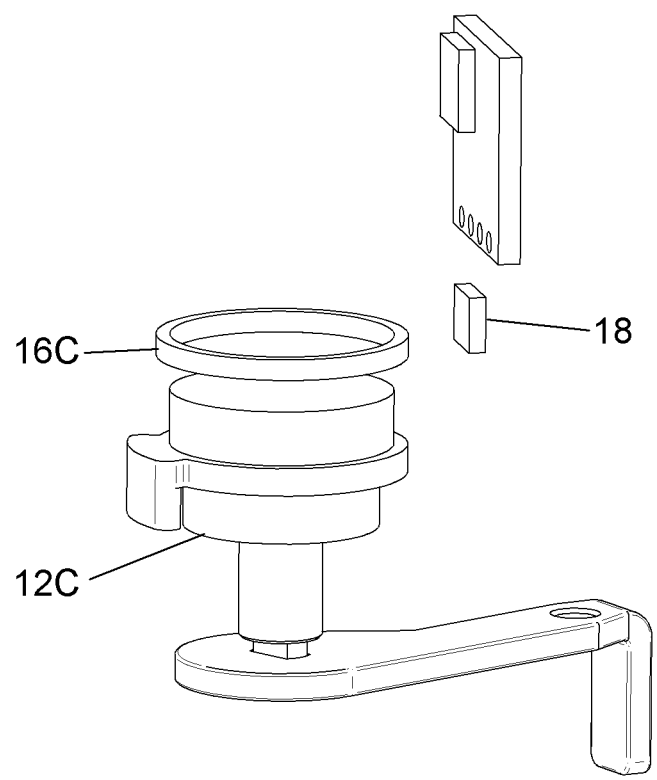
FIG. 19 is a partial exploded perspective view of the device.
Figure 20:
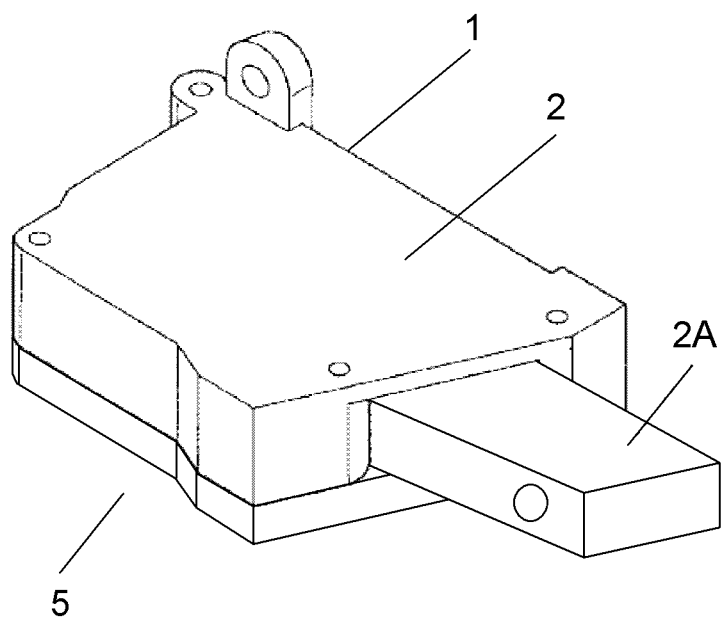
FIG. 20 is a perspective view of a conventional rotation angle detecting device.
Figure 21:
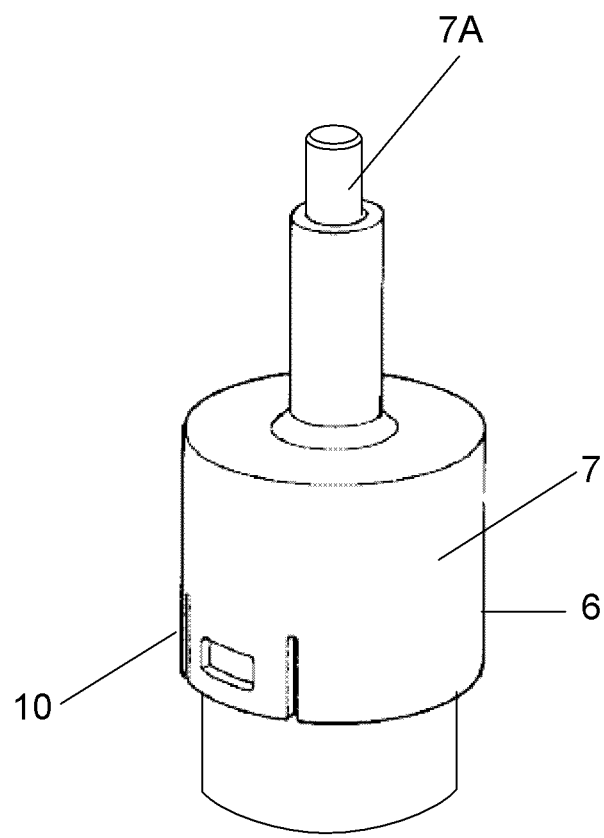
FIG. 21 is a perspective view of a conventional push switch.
Figure 22:
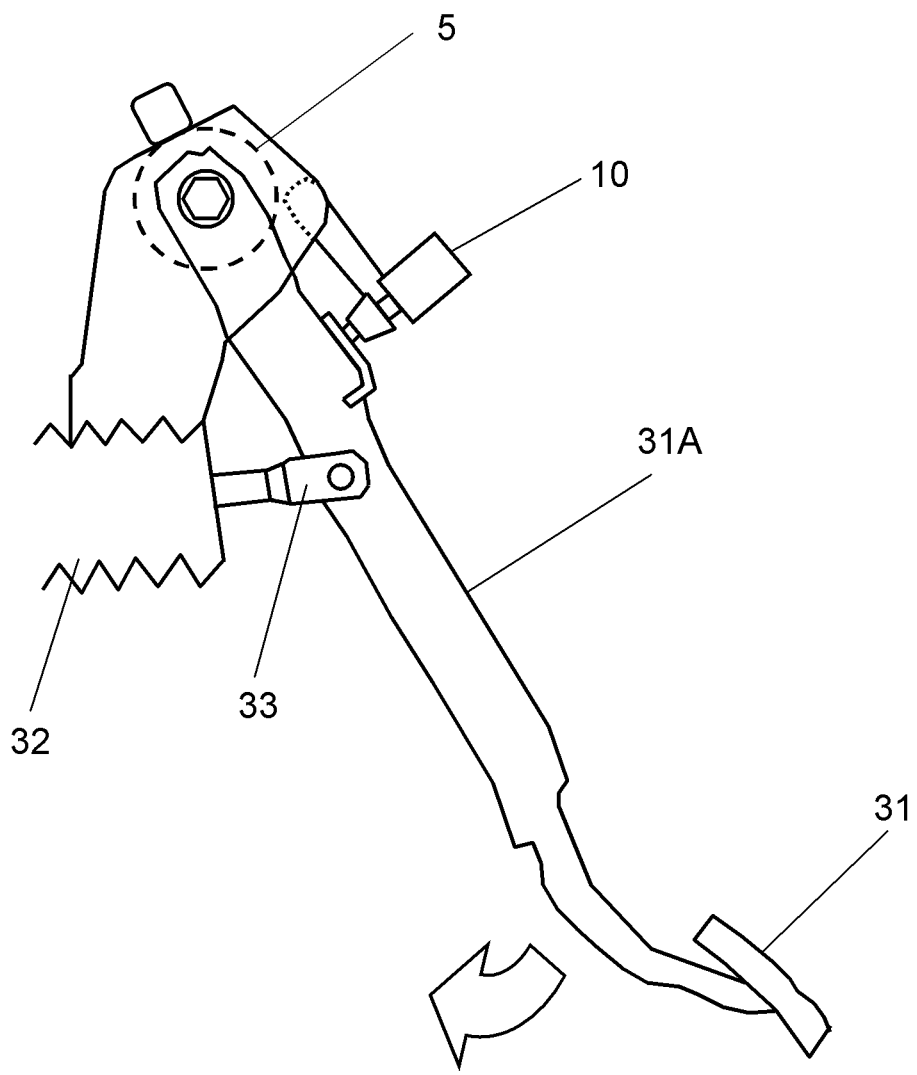
FIG. 22 is a side view showing a state where the conventional rotation angle detecting device is attached to a brake pedal.

As shown in FIG. 19, the following configuration may be used. That is, magnet 16C substantially ring-shaped with its north and south poles formed horizontally is used, and is fixedly attached onto the outer circumference of rotating body 12C so that the center of magnet 16C coincides with the rotation center of rotating body 12C. Simultaneously, magnetism detection element 18 is disposed facing magnet 16C at a predetermined angle interval from magnet 16C, laterally to magnet 16C In a case where magnet 16A, 16B, or 16C is used, forming plural north and south poles (e.g. two or four pairs of north and south poles) alternately at predetermined angle intervals enables detecting a rotation angle with a higher resolution within a predetermined rotation angle range.

In a case where magnet 16B or 16C is used, the following configuration may be used. That is, the rotation center of rotating body 12 is attached directly to brake pedal 31, and rotating body 12 is rotated by depressing brake pedal 31.

Either of the following configurations may be used. Any one of first control circuits 19 and 41, second control circuit 42, switching circuit 20, protection circuit 21, and switching circuit 47 is provided in the electronic circuit on the vehicle. Alternatively, some components out of first control circuits 19 and 41, second control circuit 42, switching circuit 20, protection circuit 21, and switching circuit 47 are formed into a single package.

Angle sensor 18 uses magnetism detection elements 18A and 18B; however, either one of them may be provided. In this case, either one of detection signal L1 or M1 from magnetism detection elements 18A and 18B is used to detect a rotation angle of rotating body 12.

The following configuration may be used. That is, in addition to magnetism detection elements 18A and 18B arranged at an angle interval of 90 degrees, additional two magnetism detection elements are provided so as to face elements 18A and 18B, namely, four magnetism detection elements are arranged at 90-degree intervals with respect to the rotation center of magnet 16. This configuration enables detecting a rotation angle reliably and highly accurately even if error-containing detection signal L2 or M2 shown in FIGS. 8A and 8B is output due to extraneous magnetism.

With magnetism detection elements arranged at 90-degree intervals, first control circuit 19 or 41 subtracts detection signals output from a pair of these opposite elements to compensate the error. This enables detecting a rotation angle reliably and highly accurately with an error eliminated or reduced.

More specifically, from a detection signal by magnetism detection element 18A, a detection signal by its opposite element is subtracted; from a detection signal by magnetism detection element 18B, a detection signal by its opposite element is subtracted. Even if magnetism detection elements 18A and 18B exhibit a vertical or horizontal deviation, first control circuit 19 or 41 can detect the deviation by means of strength and weakness of magnetism detected. Hence, correcting the deviation enables detecting a rotation angle in a state free from an error.

The rotation angle detecting device according to the above embodiments may be used for detecting movement of various types of vehicle pedals such as, for example, a clutch pedal and gas pedal. For example, first control circuit 41 may output a signal for releasing what is called cruise control, or may output plural switching signals.

What is claimed is:

1. A rotation angle detecting device comprising:
a rotating body adapted to rotate according to a rotation of a vehicle component;
a magnet attached to the rotating body;
first and second magnetism detection elements disposed facing the magnet at a predetermined interval from the magnet; and
a first control circuit connected to the first and second magnetism detection elements,
a second control circuit configured to receive the first and second detection signals as an input; and
a switching circuit connected to the first control circuit and the second control circuit,
wherein a center of the magnet is disposed at a rotation center of the rotating body,
wherein the first and second magnetism detection elements detect magnetism of the magnet and output first and second detection signals, respectively, and
wherein the first control circuit receives the first and second detection signals as an input, calculates at least one of first and second computing signals the first computing signal being obtained by adding the first and second detection signals and the second computing signal being obtained by subtracting one of the first and second detection signals from the other thereof, and outputs an angle signal corresponding to a rotation angle of the rotating body according to at least one of the first and second computing signals,
wherein the second control circuit divides the first detection signal by the second detection signal so as to calculate a third computing signal, divides the second detection signal by the first detection signal so as to calculate a fourth computing signal, and then converts the third and fourth computing signals to an inverse function to calculate first and second conversion signals and determines the rotation angle of the rotating body based on the first and second conversion signals and polarity and magnitude correlation between the first and second detection signals, and
wherein the switching circuit switches between operation by the first control circuit and operation by the second control circuit according to a value of voltage input into the switching circuit.

2. A rotation angle detecting device comprising:
a rotating body adapted to rotate according to a rotation of a vehicle component;
a magnet attached to the rotating body;
first and second magnetism detection elements disposed facing the magnet at a predetermined interval from the magnet; and
a first control circuit connected to the first and second magnetism detection elements,
wherein a center of the magnet is disposed at a rotation center of the rotating body,
wherein the first and second magnetism detection elements detect magnetism of the magnet and output first and second detection signals, respectively,
wherein the first control circuit receives the first and second detection signals as an input, calculates at least one of first and second computing signals, the first computing signal being obtained by adding the first and second detection signals and the second computing signal being obtained by subtracting one of the first and second detection signals from the other thereof, and outputs an angle signal corresponding to a rotation angle of the rotating body according to at least one of the first and second computing signals, wherein the rotating body includes:
a main rotating body; and
an auxiliary rotating body rotating in conjunction with the main rotating body,
wherein the magnet includes:
a main magnet disposed at a rotation center of the main rotating body; and
an auxiliary magnet disposed at a rotation center of the auxiliary rotating body,
wherein the first magnetism detection element includes:
a main first magnetism detection element disposed facing the main magnet at a predetermined interval from the main magnet; and
an auxiliary first magnetism detection element disposed facing the auxiliary magnet at a predetermined interval from the auxiliary magnet,
wherein the second magnetism detection element includes:
a main second magnetism detection element disposed facing the main magnet at a predetermined interval from the main magnet; and
an auxiliary second magnetism detection element disposed facing the auxiliary magnet at a predetermined interval from the auxiliary magnet,
wherein the main first magnetism detection element and the main second magnetism detection element comprise a main magnetism detection element, and the auxiliary first magnetism detection element and the auxiliary second magnetism detection element comprise an auxiliary magnetism detection element,
wherein the rotation angle detecting device further includes a comparator circuit connected to the first control circuit and the auxiliary magnetism detection element,
wherein the first control circuit outputs a switching signal according to the rotation angle of the main rotating body, and
wherein the comparator circuit compares the switching signal input from the first control circuit with an auxiliary detection signal input from the auxiliary magnetism detection element, and outputs a notice signal if the signals do not have a predetermined relationship.

3. A rotation angle detecting device comprising:
a rotating body adapted to rotate according to a rotation of a vehicle component;
a magnet attached to the rotating body;
a plurality of magnetism detection elements disposed facing the magnet at a predetermined interval from the magnet;
a first control circuit connected to the plurality of magnetism detection elements;
a second control circuit; and
a switching circuit connected to the first and second control circuits,
wherein a center of the magnet is disposed at a rotation center of the rotating body,
wherein the plurality of magnetism detection elements detect magnetism of the magnet and output detection signals, respectively, and
wherein the first control circuit receives the detection signals from the plurality of magnetism detection elements as an input, adds or subtracts the detection signals output from the plurality of magnetism detection elements to determine a rotation angle of the rotation body, outputs an angle signal corresponding to the rotation angle of the rotating body, and outputs a switching signal according to the rotation angle of the rotating body,
wherein the second control circuit divides the detection signals output from the plurality of magnetism detection elements to obtain a result, and then converts the result to an inverse function to determine the rotation angle of the rotating body, and
wherein the switching circuit switches between operation by the first control circuit and operation by the second control circuit according to a value of voltage input into the switching circuit.

4. A rotation angle detecting device comprising:
a main rotating body adapted to rotate according to a rotation of a vehicle component;
an auxiliary rotating body rotating in conjunction with the main rotating body;
a main magnet attached to the main rotating body;
an auxiliary magnet disposed at a rotation center of the auxiliary rotating body;
a main magnetism detection element disposed facing the main magnet at a predetermined interval from the main magnet;
an auxiliary magnetism detection element disposed facing the auxiliary magnet at a predetermined interval from the auxiliary magnet;
a first control circuit connected to the main magnetism detection element and the auxiliary magnetism detection element; and
a comparator circuit connected to the first control circuit and the auxiliary magnetism detection element,
wherein a center of the main magnet is disposed at a rotation center of the main rotating body and a center of the auxiliary magnet is disposed at a rotation center of the auxiliary rotating body,
wherein the main magnetism detection element detects magnetism of the main magnet and outputs a main detection signal, and the auxiliary magnetism detection element detects magnetism of the auxiliary magnet and outputs an auxiliary detection signal,
wherein the first control circuit receives the main detection signal and the auxiliary detection signal as an input, outputs an angle signal corresponding to a rotation angle of the main rotating body according to the received main and auxiliary detection signals, and outputs a switching signal according to the rotation angle of the main rotating body, and
wherein the comparator circuit compares the switching signal input from the first control circuit with the auxiliary detection signal input from the auxiliary magnetism detection element, and outputs a notice signal if the switching signal and the auxiliary detection signal do not have a predetermined relationship.

* * * * *